United States Patent [19]

Zacharias

[11] Patent Number: 4,587,877

[45] Date of Patent: May 13, 1986

[54] KEY BOARD SYSTEM FOR AN ELECTRONIC MUSICAL INSTRUMENT

[75] Inventor: Ernst Zacharias, Trossingen, Fed. Rep. of Germany

[73] Assignee: Matth Hohner AG, Trossingen, Fed. Rep. of Germany

[21] Appl. No.: 673,326

[22] Filed: Nov. 20, 1984

[30] Foreign Application Priority Data

Nov. 25, 1983 [DE] Fed. Rep. of Germany ....... 3342558

[51] Int. Cl.4 .......................... G01H 1/00; G10C 3/12

[52] U.S. Cl. .......................................... 84/1.1; 84/1.27; 84/DIG. 24

[58] Field of Search ........................ 84/1.09, 1.1, 1.27, 84/1.13, 1.26, 433–440, DIG. 7, DIG. 24

[56] References Cited

U.S. PATENT DOCUMENTS

| | | | |
|---|---|---|---|
| 3,580,979 | 5/1971 | Amano | 84/1.1 |
| 3,588,310 | 6/1971 | Gschwandtner | 84/1.13 |
| 3,634,593 | 1/1972 | Nagano | 84/1.26 X |
| 3,711,617 | 1/1973 | Evans | 84/DIG. 24 |
| 4,058,045 | 11/1977 | Jennings et al. | 84/DIG. 24 |
| 4,342,246 | 8/1982 | Rhodes et al. | 84/1.26 X |

FOREIGN PATENT DOCUMENTS

| | | | |
|---|---|---|---|
| 38211 | 3/1977 | Japan | 84/DIG. 24 |

*Primary Examiner*—William B. Perky

[57] ABSTRACT

In a key board system for an electronic musical instrument, input signals for the instrument generated in response to key actuation have an electrical characteristic which varies as a function of the key actuation force. The foregoing results from the deflection of a mass-carrying leaf spring in response to a key stroke, the input signal being generated by a piezoelectric element mounted on the leaf spring and being deformed in response to the deflection thereof.

11 Claims, 1 Drawing Figure

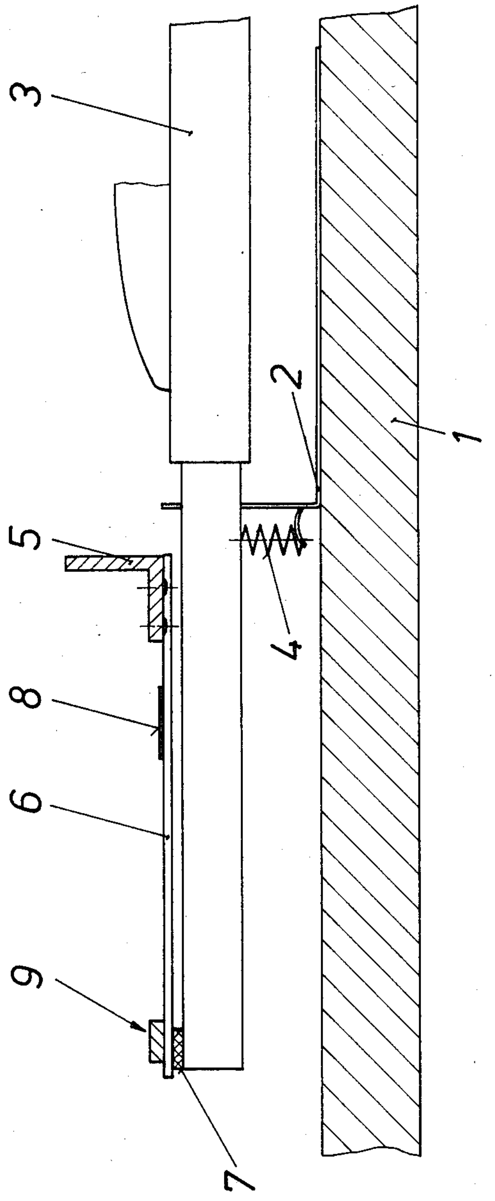
3
2
1
5
4
8
6
9
7

KEY BOARD SYSTEM FOR AN ELECTRONIC MUSICAL INSTRUMENT

BACKGROUND OF THE INVENTION (1) Field of the Invention

The present invention relates to the generation of electrical signals commensurate with sounds to be produced by a key board actuated electronic musical instrument and particularly to the production of signals which identify both the selected key and the manner in which that key has been operated. More specifically, this invention is directed to key board systems for electronic musical instruments and especially to key/transducer arrangements which provide electrical signals commensurate with the key touch dynamics. Accordingly, the general objects of the present invention are to provide novel and improved methods and apparatus of such character.

(2) Description of the Prior Art

Electronic musical instruments, particularly those which have a key board system for the election of individual sounds to be produced, are well-known in the art. While the previously available electronic key board instruments, i.e., electronic organs, have been quite versatile, there has nevertheless been a long standing desire to enhance the ability of such instruments to simulate the sounds produced by a piano. In conventional pianos, the volume of the generated sound depends upon the force with which the player actuates the piano keys. There is significant demand for electronic organs which, insofar as the generated sound is concerned, behave like conventional pianos.

The state-of-the-art is believed to be exemplified by the article "PIEZOTASTEN SORGEN FUR PIANO-EFFEKT IN ELECTRONISCHEN ORGELN" by P. Kleinschmidt, appearing at pages 1125–1126 of the 1977 issue of FUNKSCHAU. The aforementioned article describes a key system for an electronic organ wherein an arm of the key abuts a piezoelectric element and the electrical signal produced by the piezoelectric element at least in part depends upon the nature of the mechanical pulse transmitted thereto by the key.

Another example of prior art may be seen from published German Patent Application No. DE-OS 22 61 071 which discloses a key system wherein a "hammer" is displaced by the key, the displacement being a function of the mechanical pulse transmitted by the key. In the system of the published application the hammer displacement is transduced into an electrical signal by a pressure-sensitive resistor.

Capacitive key associated transducer systems are also known. In such systems the source of charging current for a capacitance is disconnected upon initial actuation of the key and the charge remaining on the capacitor, which discharges during the key stroke, is sensed at the end of the stroke. In such capacitive systems the charge remaining on the capacitor at the end of the key stroke is a function of the speed of the stroke. Such capacative systems incorrectly presume that key stroke speed is necessarily a function of the force with which the key has been actuated.

SUMMARY OF THE INVENTION

The present invention constitutes an improvement over previously suggested and available key/transducer systems, such improvement being embodied in a novel technique for the generation of an electrical signal having a magnitude which is related to impact force on a key of a keyboard-type electronic musical instrument. The present invention also encompasses apparatus for implementing this novel technique.

A key system in accordance with the invention comprises a piezoelectric element which is deformed upon actuation of an associated key. The piezoelectric element is mounted on a leaf spring which is deflected by the key. The leaf spring also carries a mass which is subjected to acceleration forces in response to the actuation of the key. A signal processing circuit is connected to the piezoelectric element and the input current to this processing circuit will be a function of the charge generated by the piezoelectric crystal which, in turn, is proportional to the deformation force to which the crystal is subjected.

Employing the key system of the present invention, a very soft touch on the key will cause the generation of an input signal for the processing circuit which exceeds the noise level by a significant amount. If the key is struck with significant force, the mass mounted on the leaf spring is accelerated thereby causing the spring to be deflected to a greater extent than the distance of the limited key stroke, i.e., the mechanical movement of the key is amplified. Accordingly, the deformation of the piezoelectric crystal, and the input signal to the processing circuit, will be of considerably greater magnitude, i.e., for the same key stroke length the deflection of the leaf spring, and thus the deformation of the piezoelectric crystal, will be a function of actuation force. The relationship between the magnitude of the input signal to the processing circuit connected to the piezoelectric crystal and the key actuation force is a function of a plurality of parameters which may be varied by the instrument designer in an attempt to optimize the "strike characteristics" of his instrument. These parameters include the characteristics of the leaf spring on which the piezoelectric crystal is mounted, the size and position of the mass which is also mounted on the leaf spring, the disposition of the piezoelectric crystal, etc.

It is, accordingly, an object of the present invention to provide a key system for electronic musical instruments which permits the generation of signals having magnitudes which are related to the impact forces with which each key is actuated.

It is a further object of the present invention to provide a key system which produces, upon very slight key impact, a signal having a magnitude which is considerably above the noise level, and which nevertheless has a large dynamic range.

It is yet another object of the present invention to provide a key system for electronic musical instruments which is characterized by uncomplicated construction, particularly by the use of the minimum number of mechanical and electrical components, and which may easily be accommodated in a key board housing.

BRIEF DESCRIPTION OF THE DRAWING

The present invention may be better understood and its numerous objects and advantages will become apparent to those skilled in the art by reference to the accompanying drawing which is a schematic side-elevation view of a key/transducer combination in accordance with a preferred embodiment of the invention.

DESCRIPTION OF THE DISCLOSED INVENTION

With reference to the drawing, a single key 3 of a key system in accordance with the present invention is represented. The key will be mounted, along with a plurality of substantially identical keys, from a base frame 1 by means of a key pivot bracket 2. In the disclosed embodiment the bracket 2 has a knife-edge support for each of the elongated keys. The keys, for example the key 3 depicted in the drawing, will typically be biased into a rest or unactuated position by means of a return spring 4.

An L-shaped bracket 5 is supported in the instrument above key 3 and at the side thereof which is opposite, with respect to the pivot point, from the portion where the actuation force is applied by the player of the instrument. A leaf spring 6 is affixed to bar 5 for each key of the instrument. In the disclosed embodiment a first end of leaf spring 6 is riveted to bar 5. The leaf spring 6 extends parallel to an extension of key 3. The free or distal end of each spring 6 carries a mass 9. When the key is in the unactuated state as shown, the free end of spring 6 abuts an attenuator pillow 7 which is mounted on the free end of key 3. Pillow 7 will typically be comprised of felt. A piezoelectric crystal 8 will be adhesively secured to leaf spring 6 at the appropriate point intermediate bar 5 and mass 9. Typically, crystal 8 will be positioned adjacent to the stationary end of spring 6.

With key 3 in the unactuated condition, the leaf spring 6 will rest with little or no bias on pillow 7. Leaf spring 6, in the disclosed embodiment, is very weak when compared to return spring 4. Accordingly, the mass 9 will be efficiently accelerated by even a key stroke of moderate energy. The delivery of an acceleration force to mass 9, by striking the key with the finger, will result in the spring 6 being deflected away from key 3. The pillow 7 prevents bouncing when spring 6, because of its bias, returns to the position where it is in contact with pillow 7.

It is to be noted that, as an alternative embodiment, the leaf spring 6 may also perform the function of biasing the key to the unactuated position thereby eliminating the need for the return spring 4.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for generating electrical input signals for an electronic musical instrument comprising:

key means, said key means including an elongated member supported intermediate its length for pivotal motion;

means for resiliently biasing said key means elongated member to a rest position;

a leaf spring, said spring having first and second oppositely disposed ends;

means supporting said leaf spring so that at least a portion thereof is adjacent a portion of said key means elongated member, said support means engaging said leaf spring adjacent the first end thereof, actuation of said key means causing said elongated member to pivot from said rest position whereby said portion of said elonaged member will move toward said leaf spring portion and a deflection force will be imparted to said leaf spring;

a piezoelectric element mounted on said leaf spring, said piezoelectric element being deformed by deflection of said leaf spring and producing an electrical output signal upon deformation; and a mass mounted on said leaf spring, said mass being dimensioned to be accelerated whereby a deflection force imparted to said leaf spring upon actuation of said key means will be amplified.

2. The apparatus of claim 1 wherein said biasing means comprises:

a return spring, said return spring being stiffer than said leaf spring.

3. The apparatus of claim 1 wherein said leaf spring is slack-coupled to said key means elongated member.

4. The apparatus of claim 1 wherein said leaf spring extends substantially parallel to said key means elongated member and said mass is disposed adjacent the second end of said leaf spring.

5. The apparatus of claim 4 further comprising:

cushion means supporting said leaf spring on said key means elongated member when said key means is in the unacutated state.

6. The apparatus of claim 4 wherein said leaf spring is slack-coupled to said key means elongated member.

7. The apparatus of claim 5 wherein said biasing means comprises:

a return spring, said return spring being stiffer than said leaf spring.

8. The apparatus of claim 5 wherein said leaf spring is substantially undeflected when said key means is in the unactuated state.

9. The apparatus of claim 5 wherein said cushion means comprises:

an antenuation pillow positioned between said leaf spring and said key means elongated member.

10. The apparatus of claim 7 wherein said cushion means comprises:

an antenuation pillow positioned between said leaf spring and said key means elongated member.

11. The apparatus of claim 8 wherein said cushion means comprises:

an antenuation pillow positioned between said leaf spring and said key means elongated member.

* * * * *